United States Patent [19]

Kolbe et al.

[11] Patent Number: 5,322,356
[45] Date of Patent: Jun. 21, 1994

[54] METHOD AND CIRCUIT CONFIGURATION TO AUGMENT THE DRIVING STABILITY OF A ROAD VEHICLE

[75] Inventors: Alexander Kolbe, Gross Zimmern; Klemens Roesch, Bingen, both of Fed. Rep. of Germany

[73] Assignee: Alfred Teves GmbH, Frankfurt am Main, Fed. Rep. of Germany

[21] Appl. No.: 972,477

[22] PCT Filed: Jul. 2, 1991

[86] PCT No.: PCT/EP91/01233

§ 371 Date: Jan. 14, 1993

§ 102(e) Date: Jan. 14, 1993

[87] PCT Pub. No.: WO92/01591

PCT Pub. Date: Feb. 6, 1992

[30] Foreign Application Priority Data

Jul. 14, 1990 [DE] Fed. Rep. of Germany ....... 4022471

[51] Int. Cl.$^5$ .............................................. B60T 8/62
[52] U.S. Cl. ................................. 303/111; 303/113.5; 364/426.02
[58] Field of Search ................... 180/197; 364/426.02, 364/426.01, 426.03; 303/103, 110, 111, 113.2, 113.3, 113.5, DIG. 3, DIG. 4

[56] References Cited

U.S. PATENT DOCUMENTS

| | | | |
|---|---|---|---|
| 3,926,477 | 12/1975 | Klatt | 303/111 |
| 4,349,876 | 9/1982 | Lindemann | 303/111 X |
| 4,374,421 | 2/1983 | Leiber | 303/111 X |
| 4,793,663 | 12/1988 | Ocvirk et al. | 303/110 |
| 4,979,784 | 12/1990 | Arikawa | 303/111 |
| 5,011,235 | 4/1991 | Arikawa | 303/111 X |
| 5,058,699 | 10/1991 | Fennel et al. | 180/197 |
| 5,063,514 | 11/1991 | Headley et al. | 303/111 X |
| 5,100,209 | 3/1992 | ARikawa | 303/111 X |
| 5,224,766 | 7/1993 | Oikawa et al. | 303/113.5 X |

FOREIGN PATENT DOCUMENTS

| | | |
|---|---|---|
| 3624722 | 1/1988 | Fed. Rep. of Germany . |
| 3724575 | 2/1988 | Fed. Rep. of Germany . |
| 3741247 | 5/1989 | Fed. Rep. of Germany . |
| 3740433 | 6/1989 | Fed. Rep. of Germany . |
| 3741248 | 6/1989 | Fed. Rep. of Germany . |
| 3801267 | 8/1989 | Fed. Rep. of Germany . |
| 3901257 | 8/1989 | Fed. Rep. of Germany . |
| 3809101 | 9/1989 | Fed. Rep. of Germany . |
| 3814956 | 11/1989 | Fed. Rep. of Germany . |
| 3814957 | 11/1989 | Fed. Rep. of Germany . |
| 3931210 | 3/1990 | Fed. Rep. of Germany . |
| 62217569 | 3/1989 | Japan . |

OTHER PUBLICATIONS

H. Gaus, H. J. Schopf, "ASD, ASR und 4Matic," *ATZ Automobiltechnische Zeitschrift*, Bd.88, No. 5, (May, 1986).

*Primary Examiner*—Robert J. Oberleitner
*Assistant Examiner*—Alfred Muratori
*Attorney, Agent, or Firm*—Robert P. Seitter; J. Gordon Lewis

[57] ABSTRACT

A method and a circuit configuration to augment the driving stability of a road vehicle using traction slip control by brake management. The drive wheel is identified which instantaneously exhibits the higher coefficient of friction (HM-wheel). The rotational pattern of this wheel is monitored and stabilized by brake management as soon as the traction slip of this wheel exceeds a limit value. Braking pressure which may exist in the wheel brake of the second drive wheel (LM-wheel) is decreased.

18 Claims, 2 Drawing Sheets

METHOD AND CIRCUIT CONFIGURATION TO AUGMENT THE DRIVING STABILITY OF A ROAD VEHICLE

BACKGROUND OF THE INVENTION

The present invention relates to a method and a circuit configuration to augment or preserve the driving stability of a road vehicle by controlling the traction slip by means of a brake management system.

To improve the starting behavior and the traction of a road vehicle, it is known to install devices on the vehicle which prevent spinning of the drive wheels or excessive traction slip. Such spinning tendencies occur as soon as the traction torque of the vehicle engine exceeds the torque which is transmittable through the wheels onto the road.

With rising traction slip, it is not only the torque in the driving direction that is transmittable onto the road which decreases—after having exceeded a maximum—but also the lateral guide force of the wheels decreases to a relatively very small amount. Due to this, the steerability and the driving behavior during cornering is impaired in vehicles with front-wheel drive. In vehicles with rear-wheel drive, there is even the risk of skidding when the lateral guide force is too small.

To control the traction slip, it is known from German published patent application 36 24 722 A1, which herein is referred to as an example of a great number of publications relating to systems of this type, to stabilize the imminently spinning drive wheel by way of brake management. In consideration of the temperature and the loading capacity of the brake, the period of time in which the brake can compensate for the excess torque of the drive axle is very limited. For this reason, brake management is combined with engine management in other known traction slip control systems, for instance as described in German published patent application 38 09 101 A1. However, this entails considerably greater expenditures.

DE 38 01 267 A1 teaches a vehicle brake system wherein, for augmenting the driving stability during braking on a surface with a different coefficient of friction right/left, the braking pressure is reduced on that rear wheel running on the non-skid road surface once the brake slip on this wheel exceeds a predefined value. This way, the lateral guiding force which can be generated by this wheel is increased, and swerving of the vehicle is prevented. This brake system is used instead of an anti-lock brake system.

SUMMARY OF THE INVENTION

It is an object of the present invention to provide a method of controlling traction slip which is exclusively based on brake management, the operation of which is not limited for a short period of time in consideration of the brake load. This method should contribute to enhancing the driving stability.

It has been shown that this object can be achieved by a method by which the rotational pattern of a wheel (HM-wheel) is monitored and stabilized by brake management as soon as the traction slip of this wheel exceeds a limit value and after commencement of brake management on the wheel (HM-wheel) having the higher coefficient of friction, the introduction of braking pressure into the wheel brake of the second wheel (LM-wheel) of the axle is prevented, and braking pressure existing in the wheel brake of this second wheel (LM-wheel) is kept constant or is decreased.

Previously, traction slip control served above all to stabilize by brake management that wheel of the drive axle which was relieved from load and exhibited the lower coefficient of friction. The present invention is based on the findings that it is sufficient and useful to ensure, in every situation and every driving condition, that the wheel driven on the higher coefficient of friction remains stable. Traction slip tendencies on this HM-wheel are compensated for by brake management, so that the lateral guide force of this wheel is preserved. The behavior of the wheel relieved from load (LM-wheel) is of secondary importance in this situation. By using a method in accordance with the invention, further pressure increase on this LM-wheel is prevented and, as the case may be, prevailing braking pressure is reduced.

What is important is to properly identify, at any time, the wheel exhibiting the greater lateral guide force. In a favorable embodiment of the invention, this wheel is identified by evaluation of test values and criteria indicative of the rotational pattern of the driven wheels (e.g. by the chronological order of the two wheels of a driven axle becoming unstable), by comparison of the (filtered) traction slip of these two wheels, or in any similar fashion. In prior art systems, traction slip has been controlled in a conventional manner by controlled brake application of the wheel under lesser load (this type of control is referred to herein as "traction slip control" to make a distinction vis-a-vis the invention). In the present invention, the wheel exhibiting the greater lateral guide force can be identified by comparison of the mean braking pressure level in the wheel brakes of the two driven wheels during this traction slip control.

An advantageous circuit configuration for implementing the invention is composed of circuitry for the identification of the wheel which instantaneously exhibits the higher coefficient of friction, for monitoring this wheel, and for controlling the braking pressure when this wheel becomes unstable. This circuitry is intended as a supplementary unit to a circuit for traction slip control by brake management which becomes operative when a driven wheel becomes unstable and the circuitry begins to function as soon as the vehicle speed exceeds a predetermined speed threshold or as soon as predetermined criteria are fulfilled which are indicative of an excessive load on the wheel brakes or on other vehicle components. Further, means are provided which, after brake management commences on the wheel (HM-wheel) exhibiting the higher coefficient of friction, prevent the introduction of braking pressure into the wheel brake of the second wheel (LM-wheel) of this axle, these means keeping constant, or reducing in this case, braking pressure prevailing in the wheel brake of this second wheel (LM-wheel). The above-mentioned speed threshold is suitably set to a value between 20 and 50 km/h (e.g. to 25 km/h). At the onset of the control responsive to the rotational pattern of the HM-wheel (referred to herein as "stability control" or "SK"), the traction slip control expediently is disconnected in this combination of traction slip control and stability control.

According to another aspect of this invention, the HM-wheel-responsive control, instead of the traction slip control, starts to function as soon as the brake temperature, or an approximation of the temperature obtained by measuring the operations determining the brake temperature (temperature pattern), exceeds a limit value.

Further features, advantages and possibilities of application of this invention will become apparent from the following description of an embodiment with reference to the accompanying drawings.

DETAILED DESCRIPTION OF THE INVENTION

Figure 1:
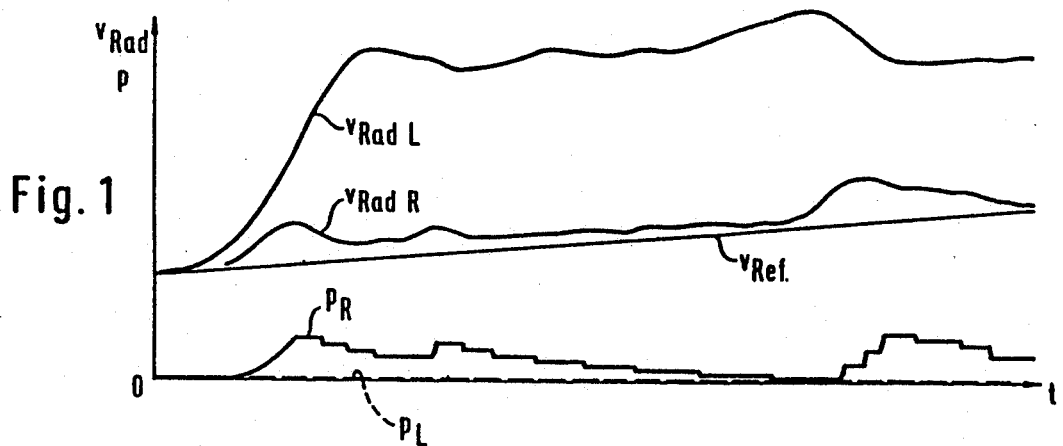
FIGS. 1 to 3 are graphs showing the rotational pattern ($v_{Rad}$) of the two wheels of a driven axle, the vehicle reference speed ($v_{Ref}$) and the braking pressure variation (P) in different situations which are important for the application of the invention.
Figure 2:
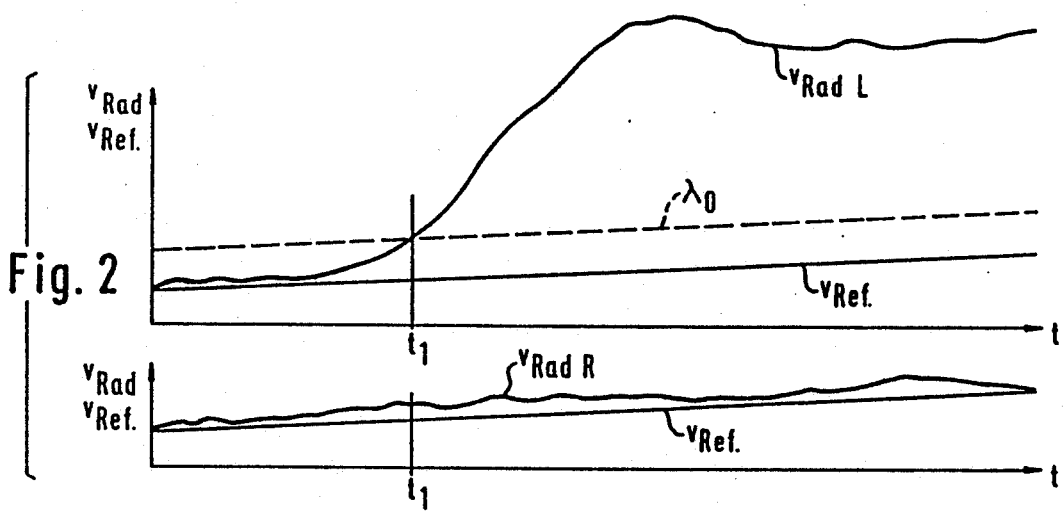
Figure 3:
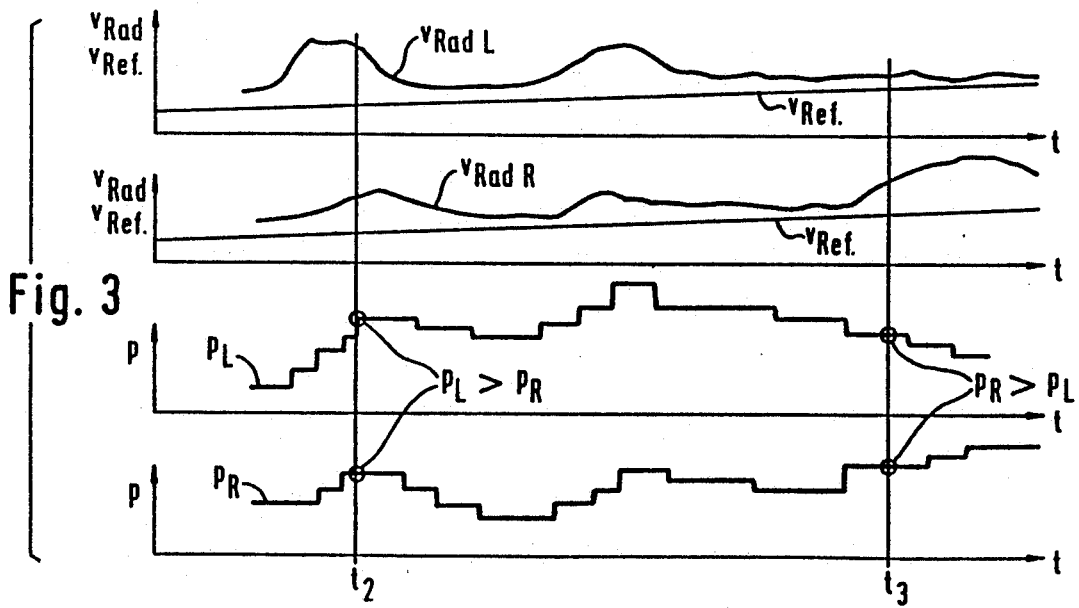

The diagrams in FIGS. 1 to 3 serve to illustrate the control operations in application of the present invention.

The driving stability of a driven vehicle can be safeguarded in any driving condition by brake management alone, provided the control is devised such that at least the HM-wheel, (i.e., the wheel running on the higher coefficient of friction) or the traction slip of this wheel, is maintained within a range in which this wheel can exert a great lateral guide force. That is to say, the traction slip of this HM-wheel is kept at a low value by brake management. The second wheel of the driven axle may exhibit great traction slip in this situation without driving stability being jeopardized. Driving stability is preserved even if the wheel running on the lower coefficient of friction exhibits great traction slip or races and, consequently, can receive only a minimum of lateral guide force.

FIG. 1 shows the rotational pattern of the two driven front wheels and the variation of the applied braking pressure in a like situation. $V_{RadL}$ is the speed of the left wheel and $V_{RadR}$ is the speed of the right wheel. $P_R$ and $P_L$ are the brake pressures applied to the right and left wheels, respectively.

The vehicle speed or the vehicle reference speed $V_{Ref}$ rises continuously. The left front wheel is the LM-wheel in this case because it exhibits a comparatively low coefficient of friction (Low $\mu$). It is discernible from the illustrated speed variation $V_{RadL}$ that this wheel tends to spin and exhibits a great traction slip. Hence, the left wheel is able to exert only a small amount of lateral guide force. The right front wheel, as shown by curve $V_{RadR}$, represents the HM-wheel in this case. Traction slip tendencies of the HM-wheel are compensated for by the introduction of braking pressure $P_R$ into the wheel brake of this wheel. Thus, this wheel remains stable, always displays only little traction slip and, as a result, is able to exert the great amount of lateral guide force desired. The wheel brake of the left, spinning front wheel remains pressureless ($P_L$ is practically zero). Braking pressure which possibly prevailed in the left wheel at the commencement of the illustrated process, and which might be due to a preceding customary traction slip control operation, would be decreased at the onset of stability control in accordance with the invention.

It is important for implementing a method embodying the invention to reliably identify and select the HM-wheel. To this end, a number of criteria are suitable depending on the situation. FIG. 2 shows a situation in which a proper identification of the HM-wheel is possible by determining the traction slip. At the point of time $t_1$, the traction slip on the left front wheel exceeds a slip threshold $\lambda_O$, while the speed $V_{RadR}$ on the right front wheel differs but slightly from the vehicle speed (or vehicle reference speed) $V_{Ref}$ over the entire stretch of time shown. Hence, the right front wheel is the HM-wheel which, if necessary, is stabilized by braking pressure introduction in order to preserve the lateral guide force. This application of brake pressure is not needed in the example shown in FIG. 2.

FIG. 3 shows a situation in which the traction and the starting behavior of a vehicle are improved by a conventional traction slip control operation. In performing this traction slip control operation, the running behavior of the two drive wheels is stabilized by brake management. The brake is activated as soon as an excessive amount of traction slip occurs. Of course, an excessive amount of traction slip is encountered at first on the wheel relieved from load, the one exhibiting the lower coefficient of friction (LM-wheel). Subsequently, the second wheel can also become unstable so that it too must be slowed down. Brake management in such a traction slip control operation can be done only for a short stretch of time though, because otherwise the brake overheats. The brake system must be protected by engine management, (i.e., reduction of the drive torque), or by deactivation of the traction slip control based on brake management, when the load of the brake limit is reached.

In the present case, in lieu of deactivating the traction slip control, one switches over to a method according to the invention, referred to as stability control (SK-mode). To identify the HM-wheel as a precondition for switching-over to this SK-control, the mean pressure levels of the two wheels of the driven axle are compared when traction slip control is performed. The wheel having the lowest mean pressure level is recognized as the HM-wheel. At the point of time $t_2$, during the control operation according to FIG. 3, the left front wheel has the higher pressure, as is shown by the pressure variation curves $P_L$ and $P_R$, while the pressure level $P_R$ exceeds the pressure level $P_L$ at the point of time $t_3$.

While a stability control operation according to the invention is being performed, it is not possible to identify the HM-wheel by virtue of the pressure levels. Identification of the HM-wheel is carried out in this situation by comparing the (filtered) slip of the two drive wheels. The wheel having the least traction slip is the HM-wheel in this case.

The HM-wheel is principally desired to be kept stable. This is equally true in the field of pure traction slip control, in which pressure is introduced at once when instability of a drive wheel occurs, and also after change-over to stability control according to the invention. If required, the HM-wheel is stabilized by brake management. During the stability control operation it is not necessary to build up braking pressure on the HM-wheel permanently, namely if:

a) after slip identification on the LM-wheel, no slip has been identified on the HM-wheel so far, and b) the HM-wheel maintains its stability on its own after brake management.

Although the HM-wheel continues to be monitored in the previously mentioned cases, no pressure modulation is necessary for maintaining the stable running of this wheel.

The same control criteria apply both for the HM-wheel and for the LM-wheel during the pure traction slip control.

Figure 4:
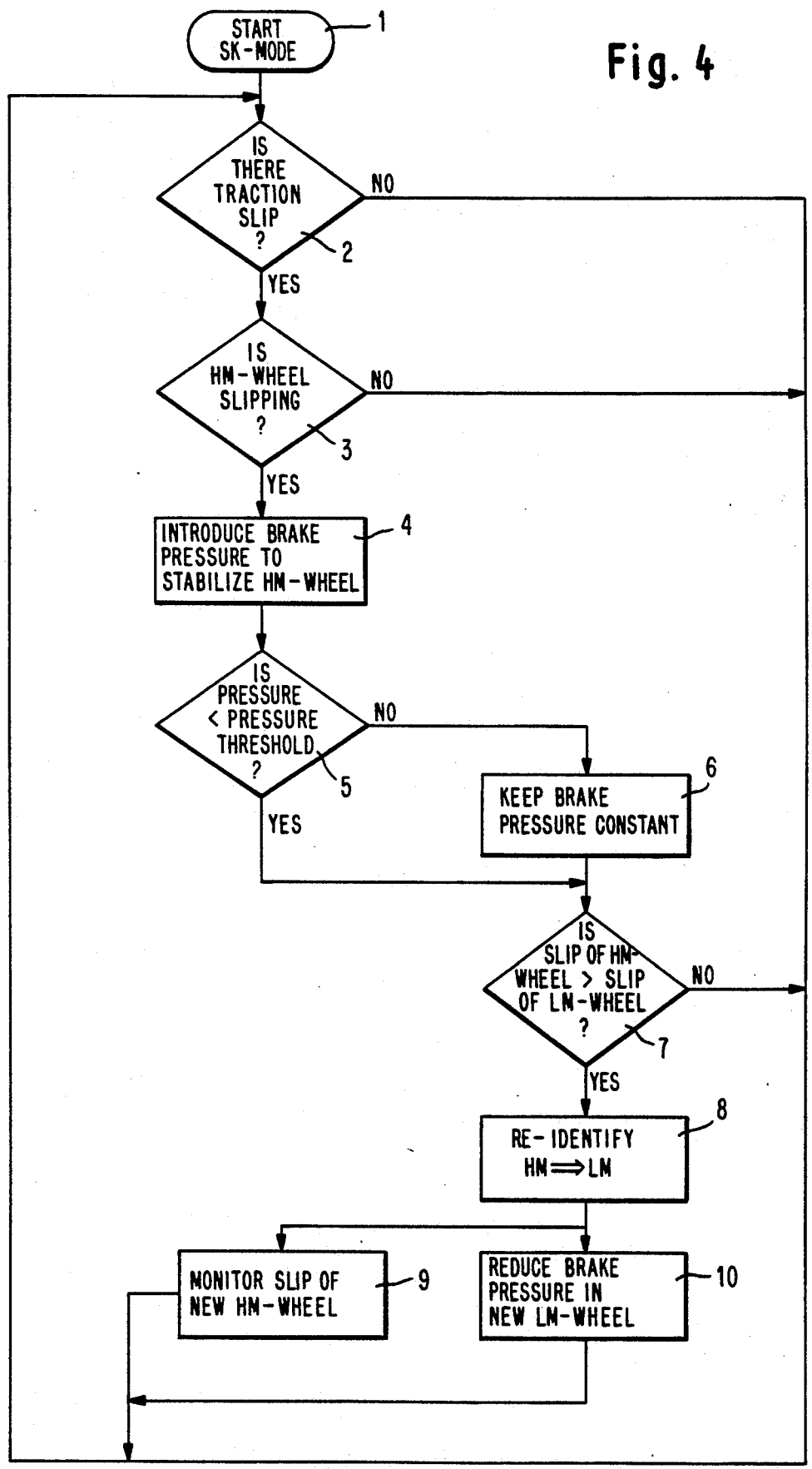
FIG. 4 is a flow chart of an embodiment of an exemplary method in accordance with the invention.

FIG. 4 is a flow chart showing the behavior of a circuit configuration according to the present invention during a specific situation. The following sequence is discernible:

At step 1, the program sequence (SK-mode) described herein begins. If the presence of traction slip is affirmed at step 2, and if this applies to the HM-wheel at step 3, the introduction of braking pressure for stabilizing the HM-wheel is initiated at step 4.

At step 5, it is determined whether the braking pressure P in the wheel brake of the HM-wheel lies below a predetermined threshold value $P_{sch}$. If not, the pressure is kept constant at step 6. In any case, a comparison of the slip of both driven wheels is performed at step 7. During the initiation of the stability control (SK-mode), the traction slip of the HM-wheel (for the physical reasons explained above) must be smaller than the slip of the second driven wheel which, as is known, runs on a lower coefficient of friction. At step 7, if the instantaneous slip of the HM-wheel is greater than the traction slip of the second wheel, there is a wrong interpretation. At step 8, the control must reorient itself. The other wheel is the HM-wheel in reality. Consequently, following step 8, at step 9, the slip monitoring is applied to the drive wheel which is now identified as the HM-wheel. Simultaneously, the braking pressure reduction on the second drive wheel, (which has now been identified as LM-wheel), is initiated at step 10.

This program sequence repeats in every loop.

That is to say, the invention provides a simple method to augment the driving stability of a vehicle during a traction operation and to ensure that driving stability is preserved. This is achieved using the brakes, without engine management. As a supplement to a traction slip control system which is based on brake management, the range of application of such a control is considerably extended. Hence, it follows that the necessary disconnection of the customary systems, in order to avoid brake overload, and the ensuing disadvantages are overcome by the invention.

We claim:

1. A method to augment or preserve driving stability of a road vehicle by controlling traction slip by means of a brake management system, characterized in that a first wheel of a driven axle is found which instantaneously exhibits a higher coefficient of friction, in that a rotational pattern of the first wheel is monitored and stabilized by brake management as soon as the traction slip of the first wheel surpasses a limit value, as well as in that after the commencement of brake management on the first wheel exhibiting the higher coefficient of friction the introduction of braking pressure into a wheel brake of a second wheel of this axle is prevented, and braking pressure prevailing in the wheel brake of the second wheel kept constant or decreased.

2. A method as claimed in claim 1, characterized in that the first wheel exhibiting the higher coefficient of friction is identified by evaluation of test values and criteria indicative of the rotational pattern of the driven wheels.

3. A method as claimed in claim 2, wherein the test values and criteria indicative of the rotational pattern of the driven wheels include the chronological order of the two first wheel and the second wheel becoming unstable.

4. A method as claimed in claim 2, wherein the test values and criteria indicative of the rotational pattern of the driven wheels include a comparison of the traction slip of the first wheel and the second wheel.

5. A circuit configuration for augmenting driving stability, comprising circuitries for identifying a first wheel which instantaneously exhibits a higher coefficient of friction, and comprising circuitries for monitoring the first wheel and for controlling the braking pressure when the first wheel becomes unstable by implementing stability control, characterized in that the circuit configuration is provided as a supplementary unit to a circuit configuration for traction slip control by brake management, which sets in when a driven wheel becomes unstable and starts to function as soon as the vehicle speed exceeds a predetermined speed threshold, or as soon as predetermined criteria are fulfilled being indicative of an excessive load on the wheel brakes or on other vehicle components, and in that means are provided which, after brake management commences on the first wheel exhibiting the higher coefficient of friction, prevent the introduction of braking pressure into a wheel brake of a second wheel, and in that these means keep constant or reduce braking pressure prevailing in the wheel brake of the second wheel.

6. A circuit configuration as claimed in claim 5, characterized in that the speed threshold is set to a value between 20 and 50 km/h.

7. A circuit configuration as claimed in claim 5, characterized in that the first wheel exhibiting the higher coefficient of friction is found by comparison of the mean braking pressure level in the wheel brakes of the two wheels of a driven axle during a traction slip control operation.

8. A circuit configuration as claimed in claim 5, characterized in that at the onset of the stability control responsive to the rotational pattern of the first wheel exhibiting the higher coefficient of friction, the traction slip control is disconnected.

9. A circuit configuration as claimed in claim 5, characterized in that the stability control responsive to the first wheel exhibiting the higher coefficient of friction instead of the traction slip control starts to function as soon as brake temperature or an approximation obtained by measuring the operations determining the brake temperature exceeds a limit value.

10. A method to improve driving stability of a road vehicle in which traction slip is regulated using brake management, said road vehicle having a driven axle, said driven axle having at least two wheels, each wheel having a respective brake and a respective coefficient of friction, the method comprising the steps of:

(a) monitoring a respective rotation of each of said wheels, and calculating a respective measure of traction slip therefrom for each respective wheel;
(b) determining when one of said measures of traction slip exceeds a predetermined value;
(c) identifying a wheel of said driven axle which has a higher instantaneous coefficient of friction than the other wheel of said driven axle, said identifying being performed when said traction slip of said identified wheel exceeds said predetermined value;
(d) stabilizing the rotation of said identified wheel using brake management, when said measure of traction slip exceeds said predetermined value; and (e) preventing an increase in braking pressure on said brake of said other wheel of said driven axle.

11. A method in accordance with claim 10, wherein the identifying step (c) includes:
(1) determining whether one of said two wheels of said driven axle remains stable after the other one of said two wheels becomes unstable; and
(2) identifying said stable wheel as having the higher coefficient of friction.

12. A method in accordance with claim 10, wherein the identifying step (c) includes:
(1) comparing respective measures of traction slip from each of said two wheels to determine which one of said wheels has a lower measure of traction slip than the other of said wheels; and
(2) identifying said wheel having a lower measure of traction slip as having the higher coefficient of friction.

13. Apparatus for improving driving stability of a road vehicle having a traction slip control system, said traction slip control system using brake management, said road vehicle having a speed and a driven axle, said driven axle having at least two wheels, each wheel having a respective coefficient of friction, the apparatus comprising:
means for monitoring a respective rotation of each of said wheels and for calculating a respective measure of traction slip therefrom for each respective wheel;
means coupled to said monitoring means for determining when one of said measures of traction slip exceeds a predetermined value;
means responsive to said determining means for identifying a wheel of said driven axle which has a higher instantaneous coefficient of friction than the other wheel of said driven axle;
means responsive to said identifying means for stabilizing the rotation of said identified wheel using brake management; and
means responsive to said identifying means for preventing an increase in braking pressure on said brake of said other wheel of said driven axle.

14. Apparatus in accordance with claim 13, further comprising:
means coupled to said monitoring means and said brakes for starting said monitoring means when an excessive load on said brakes is detected; and
means coupled to said monitoring means for starting said monitoring means when said vehicle speed exceeds a predetermined threshold value.

15. Apparatus in accordance with claim 14, wherein said threshold value is between 20 and 50 kilometers per hour.

16. Apparatus in accordance with claim 13, wherein:
(1) each of said brakes has a respective mean braking pressure, and said identifying means includes means for comparing mean braking pressures of said brakes during a traction slip control operation, and
(2) said wheel having a higher coefficient of friction is identified by said comparing.

17. Apparatus in accordance with claim 13, further comprising means for disconnecting said traction slip control system from said brakes while said stabilizing means is operating.

18. Apparatus in accordance with claim 13, wherein:
(1) each brake has a respective temperature, and
(2) said road vehicle has a traction slip control system, further comprising means for disconnecting said traction slip control system from said brakes when the temperature of one of said brakes exceeds a predetermined value.

* * * * *